July 21, 1942. O. WARD Re. 22,144

SEWAGE TREATMENT

Original Filed Sept. 30, 1939

INVENTOR
OSCAR WARD,

BY Arthur Thiessen

ATTORNEY.

Reissued July 21, 1942

Re. 22,144

UNITED STATES PATENT OFFICE 22,144

SEWAGE TREATMENT

Oscar Ward, Marshfield, Wis., assignor to The Dorr Company, Inc., New York, N. Y., a corporation of Delaware Original No. 2,258,398, dated October 7, 1941, Serial No. 297,289, September 30, 1939. Application for reissue May 29, 1942, Serial No. 444,990

4 Claims. (Cl. 210—7)

Figure 1:
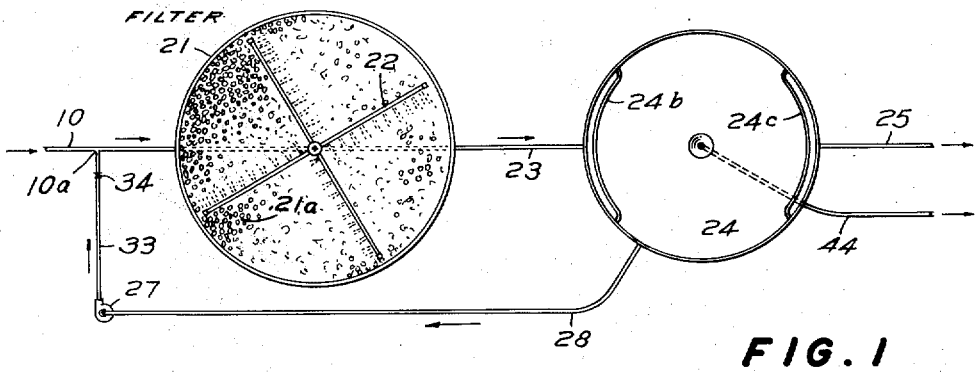

In the treatment of sewage and analogous impure trade-wastes having as pollution thereof septical organic material that is subject to putrescence, there are two main objectives, namely, to remove from the sewage liquid, solids that are in suspension and in solution therein, and to release as a result of that removal, effluent that has been purified as to its oxygen demand.

This invention relates to improvements in a process of treating liquid containing septical organic materials in which a trickling filter-bed and clarifier is used. A trickling filter-bed as usually constructed is a mass of discrete aggregative particles of stone, cinders, or the like over which sewage is distributed with the result that it trickles downwardly through the interstices of the bed and is discharged. The discrete particles are inoculated with aerobic biologic organisms ranging from bacterial flora through protozoa up to worms. The biologic organisms, which are herein sometimes referred to generically as bacteria although perhaps not quite correctly, grow on the surface of the discrete material of the filter-bed. As they are of the aerobic type, air is a necessity for them. Also, as they eat all the time, and not intermittently as do vertebrates, a constant supply of food must be provided within easy reach of them for they are immotile. Because of their immotility, the end products must be removed from them.

As the bacteria pass through their life cycle, they tend to form jelly-like interfaces around the discrete filter media and this may be said to be zoogloea which is definable as "a colony of bacteria forming a jelly-like mass" and also as "bacteria held together by a matrix secreted by themselves."

It is the tendency of bacteria in filter-beds to form this jelly that apparently accounts for the occasional but often serious ponding or flooding of filter-beds. In certain instances where a trickling filter-bed has been supplied with sewage too rapidly, there has resulted such a growth of zoogloeal jelly, that the interstices between the discrete filter mediums have become clogged and the applied liquid has thus been prevented from percolating or trickling therethrough to discharge. Ponding, which means submergence of the filter-bed, can be serious for it tends to drown or otherwise kill off the aerobic bacteria. If too many are killed off before the submergence is overcome, it may be necessary to completely inoculate the bed anew before it can properly function again.

At the same time, if too little sewage is supplied to the filter-bed, the bacteria may not get enough food to continue their life cycle, especially when it is recalled that they feed incessantly and must do so to live.

I have observed that there is a tendency to clog in the upper regions of a filter-bed while this tendency is rarely encountered in the lower region thereof. This has led to the conclusion that if the normal amount of inflowing sewage supplied to the filter-bed is augmented with sewage that has already passed through the bed, several desirable results would be expected. That is, by an agumented feed there would be (1) ample food made available to the bacteria, (2) the increased flow would flush downwardly undue accumulations of jelly that would otherwise be clogging (and also harmful to the bacteria because of their smothering action on the bacteria), and (3) living bacteria would be applied with the filter feed in such a substantial quantity that the biologic activity in the upper section would closely equal that of the lower section. Actual practice indicates that my conclusions were correct, when I passed filter-bed discharge to a clarifier and used liquid from the clarifier to augment the amount of sewage being supplied to the filter-bed.

A basic aspect of the present invention is directed to an improved filter-bed operation attained by closed-circuiting the filter-bed with a clarifier wherein liquid feed for treatment is cycled while being treated and from which end-products of the treatment leave the circuit as sludge along one path leading from the clarifier and from which effluent that has had clarification and purification treatment leads along another path.

An unexpected result of the operation of such a system is that whereas heretofore all of the biological purifying activity (or. B. O. D. satisfaction) took place in the filter-bed, I have found that as a consequence of the performing of this invention some of the purifying activity is transferred from the trickling filter to the clarifier. This means that there can be used an abnormally small filter-bed coupled in cyclic arrangement with a spacious clarifier.

Such transfer of biologic activity or its extension and substantial expansion into the clarifier and the recycling of liquor undergoing treatment as between the clarifier on the one hand and the filter-bed on the other hand leads to the ensuring and maintaining of non-ponding condition for the filter-bed and to the continuing of conditions favorable to an uninterrupted passage of sewage liquid therethrough in all areas thereof. The uninterrupted and unobstructed flow of liquid downwardly through the filter-bed carries with it quantities of the living organisms that pass with the liquid into the clarifier and with the same there is embodied and carried enough dissolved oxygen to support and maintain their life processes even when in the body of liquid within the clarifier.

When liquid is recirculated between filter-bed and clarifier, as herein proposed, I have found it highly desirable to use liquid material drawn directly from within the clarifier rather than from clarifier effluent. So this I shall refer to as tank liquor. This use of tank liquor instead of clarifier effluent for recirculation—or sewage feed augmenting—purposes, is important for the following effect that it has on clarifier size. A clarifier is designed to have a certain detention period based upon inflow thereto. Effluence is normally at the same rate as the feed. But if effluent is used for recirculation purposes, the quantity of liquid needed for recirculation will at times be greater than the inflow to the clarifier. Therefore, as effluent is increased beyond its normal rate, it will cause inflow to the clarifier to increase, and that will upset the designed detention capacity. If this be done, then the clarifier would have to be designed with abnormal capacity to give it the full detention time under all conditions. By recirculating from within the clarifier even though large quantities be used, the detention capacity of the clarifier is not changed for the effluent outflow is always constant.

This returned or recycled tank liquor serves to carry back to the filter-bed septical organics that have not yet been stabilized or rendered innocuous. This material comprises food for the bacteria in the bed, and at the same time, it also comprises nuclei that, when a non-biologic solids-congregative station is used, have the property of attracting other solids thereto and thus conditions are favorable to the desired coagmentation or coagulation thereof into settleable condition.

Other objects and aspects of the invention will become apparent from the succeeding portions of the specification.

As illustrative of certain manners in which the invention may be realized reference is made to the corresponding drawing which constitutes a part of this specification.

Figure 2:
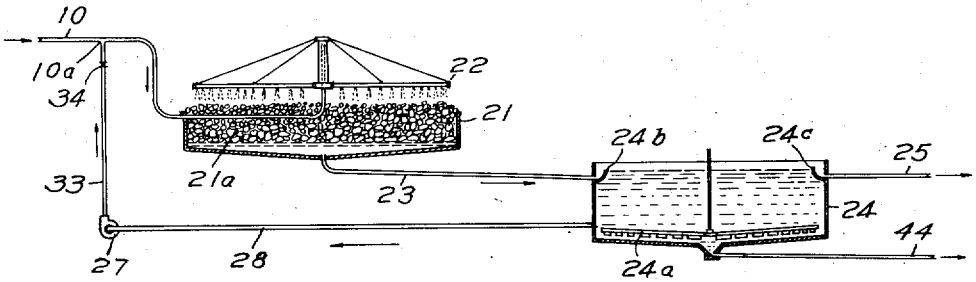

In said drawing:

Figs. 1 and 2 diagrammatically illustrate an arrangement embodying this invention wherein there is indicated a clarifier that receives the filter effluent and according to which a part of the sludge or material within the clarifier is withdrawn from the interior of the clarifier, and the sludge or material thus withdrawn provides a part of the filter-bed feed in that it returns to the liquid being fed to the filter-bed at a point ahead of the filter.

Figure 3:
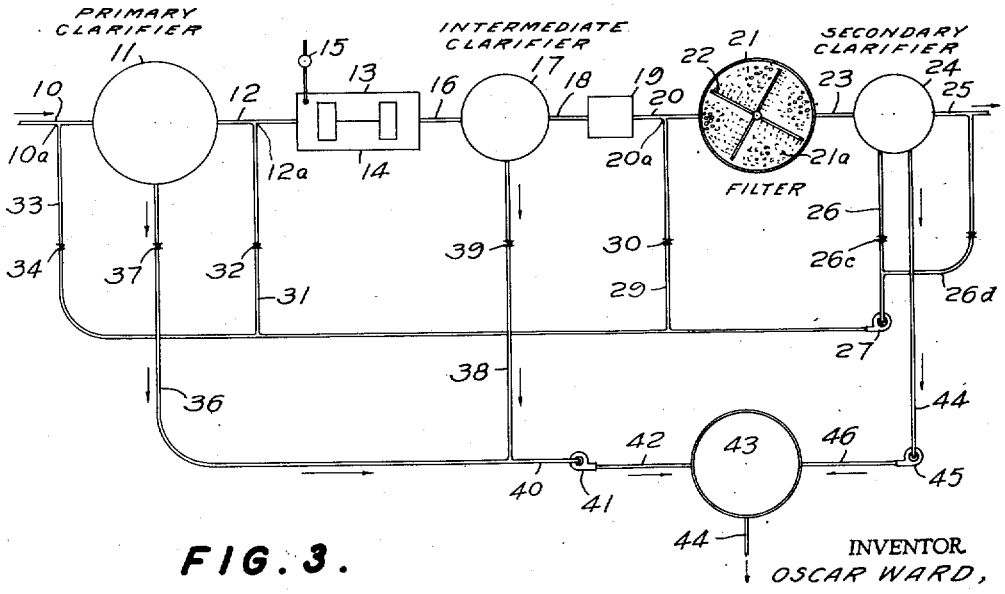

Fig. 3 diagrammatically illustrates a complete sewage disposal system wherein important features of the invention are embodied and employed. In this figure there is included or indicated not only the filter and clarifier, that receives the filter discharge, but also other units or instrumentalities which may be effectively employed in the system, for example, a preliminary or primary clarifying means located ahead of the filter, flocculating means for conditioning liquid on its way to the filter, to wit, ahead of a second or intermediate clarifier between the primary clarifier and trickling filter. Therein there is also indicated a chemical dosing ahead of the filter which may be employed if desired. In this figure there is indicated a digester for receiving sewage sludge and wherein the organics of collected and removed sludge are disposed of by aerobic sludge digestion process.

Reference will now be made to the drawing in detail:

The incoming polluted liquid containing septical organics, such as sewage containing substantial quantities of organic material of a decomposable and putrescible character, enters along the path, conduit or pipe 10. It is passed to the filter 21 having a filter-bed 21*a* therein over which the incoming sewage supplied thereto for treatment is relatively uniformly distributed as by means of a distributing mechanism generally designated by 22 and which may be of the travelling arm type, a spray nozzle type, or any other suitable type. The filter 21 is a trickling filter, the bed thereof is provided by an assemblage of discrete material as by an aggregate of broken stones, slag, coal or the like, and the sewage treated thereupon trickles down through the interstices in the presence of air. Biologic organisms and zoogloea jelly-like interfaces form or collect upon the aggregates in the filter-bed and which with proper filter operation continue to exist in the filter-bed. The functioning of this type of filter is well known. The filter effluent or discharge passes outwardly along the path 23. The path 23 leads into a sedimentation zone or clarifier of the type diagrammatically shown in Fig. 1 and in vertical cross section in Fig. 2. This clarifier is of the Dorr or equivalent mechanically cleaned type, provided with traveling sludge rakes, plows or scraper 24*a* adapted for the impelling to discharge through path 44 of solids settling or depositing on the bottom of the clarifier in the form of sediment or sludge. The clarifier is indicated as being of the cross-flow type provided with an influent launder 24*b* and an overflow or effluent launder or outlet 24*c*. Other types of clarifiers may be used so long as for the clarifier or sedimentation zone there extends a path of influent therefor; a path for overflowing clarified supernatant effluent therefrom; a path for the discharge of settled sludge; and means for returning material from the clarifier either directly or indirectly back to the filter-bed.

In the realization of the present invention some of the filter effluent is withdrawn or diverted from the path 23 which may be viewed as including the clarifier 24, that is, liquid is withdrawn from the path 23 or from the parts into which path 23 leads. The withdrawing or diverting of filter discharge may be along a path such as 28 in Figs. 1 and 2, or a path such as 26 in Fig. 3. The diverted or withdrawn liquid is transferred or lifted in appropriate amount by suitable means, as for example, centrifugal pump 27 which controllingly delivers the withdrawn material along a path such as 33 of Figs. 1 and 2, or such as 29, 31, or 33 of Fig. 3 dependent upon which path or line is opened and also according to the type of recirculation desired for a particular period.

The small crosses in each of the several lines, pipes or conduits indicate positionable control valves which are open or closed, or otherwise positioned by an operator. It will be noted that certain of such valves which are designated as 30, 32 and 34 are respectively located in the pipes, lines or conduits 29, 31 and 33. The pipe or line 33 constitutes a return leading back to point 10a at the head end of the system in the arrangement of Figs. 1 and 2. This point 10a is in the sewage supply line leading directly to the trickling filter. In the system of Fig. 3 pipe or line 33 constitutes a return to point 10a in line 10 leading to a primary or preliminary clarifier, pipe or line 31 is a return leading back to a point 12a which is in a line 12 leading directly to a flocculation station 13 which is between the primary clarifier 11 and the intermediate clarifier 17 and the pipe or line 29 is a return line leading to the point 20a which is in line 20 leading directly to the filter.

By these return lines, tank liquor is returned to the system where it or substantial quantities thereof are ultimately distributed by means of mechanism 22 over the entire filter-bed for retreatment, augmenting the inflowing sewage passing to the filter-bed for treatment thereby.

The tank liquor obtained from the clarifier 24 passes through the medium of a pipe such as 28 or part 26c of pipe 26 leading from a lower portion of the clarifier. This withdrawal of tank liquor is by means of pipes 28 or 26, as the case may be, and is from a locality within the clarifier that is functionally remote from the effluent overflow launder or clarifier effluent outlet 24c. In the instance of the arrangement of Figs. 1 and 2 this tank liquor is shown as being used to augment the new feed or polluted liquid incoming to the system through the path 10. The filter-bed 21 and the clarifier 24 thus may be said to be closed circuited in that material from the clarifier is passed back to and through the filter-bed to the clarifier again. Clarified supernatant passes from the clarifier or from the system through the launder 24c and pipe 25 referred to. Settled sludge or sediment can be passed from the clarifier or from the system as through pipe 44 leading from the lower portion of the clarifier. The clarifier, as the name implies, must have a liquid retention capacity large enough for suspended solids in the liquid fed thereto to settle therein and form a lower layer of sludge and an upper overlying layer of clarified supernatant liquid.

According to the system of Fig. 3 the incoming sewage passes along the path 10 to the place where it enters a primary clarifier 11. The effluent from the primary clarifier 11 passes along the path 12 to preliminary treating apparatus which includes a flocculation zone 13 and a second or intermediate clarification or sedimentation zone 17. From the preliminary treating apparatus just referred to, the effluent from the intermediate clarifier 17 enters and flows along pipe or line 18 to and through a dosing device 19, for supplying to the effluent if or when desired a chemical for coagulating solids therein, and from the dosing device 19 the liquid passes along the line or pipe 20 to the influent end of the trickling filter 21. The filter 21 is of the trickling filter type functioning as previously described and the incoming sewage—or incoming sewage material—is distributed over the bed 21a of this filter by the distributing mechanism 22. The filter discharge passes from the filter 21 along the path 23 into the clarifier 24 from which any portion of the contents of the clarifier is withdrawn and passed to the incoming sewage or sewage material at any point en route to the filter 21 whereby the withdrawn and returned portion from the liquid from the clarifier 24 is passed to and ultimately distributed over the bed of the filter 21 for the purpose of seeding the latter and also as an augmentive supplied with the liquid portion flowing to the filter for its initial treatment therein. According to the arrangement of Fig. 3 the preliminary treating apparatus comprises a tank or basin 13 provided with flocculation mechanism. The function of this preliminary treating apparatus is to treat or agitate the incoming sewage effluent in such a manner that flocculation takes place and is effected, some prior to the distribution of the sewage material over the filter-bed and some during the period while the sewage material undergoing treatment is passing through the bed of the filter. The apparatus 13 is indicated as having flocculation paddles 14 and a valve controlled air supply 15 either or both of which may be used for gently agitating the sewage liquid in the tank 13 in a manner favorable for carrying out and realizing flocculating operation that results in the development and amassment of settleable flocs and floc colonies formed of solids that are suspended in the liquid. According to Fig. 3 the liquid content from 13 passes along the path 16 into the intermediate clarifier 17 from the latter of which, as previously indicated, the liquid passes along the path 18 through the doser—wherein it may or may not be dosed—and ultimately to and into the filter 21.

From one point of view the clarifier 17 may be considered as a part of a composite primary clarifying unit ahead of the trickling filter and in that case the clarifier 11 may be viewed as a main primary clarifier and the clarifier 17 may be viewed as an auxiliary part of the primer clarifier. From another point of view the clarifier 17 may be considered as an intermediate clarifier and in fact it has heretofore been referred to as such.

In the embodiment of each of the figures there is a circulating pump 27 into which there passes liquid derived from the clarifier 24 through the medium of pipe 28 in Fig. 2 and through the medium of pipe 26 that has valve control branches 26c and 26d of Fig. 3. The clarifier 24 when embodied in an arrangement like that illustrated by Fig. 3 is properly referred to as a secondary clarifier or secondary sedimentation tank and is sometimes herein referred to as such. When branch 26c is open and 26d is closed tank liquor is withdrawn from the secondary sedimentation tank 24 by means of the pump 27 and is delivered to the incoming sewage as through the pipe 29 which is opened or closed or otherwise controlled by valve 30, pipe 31 which is opened or closed or otherwise controlled by valve 32, and/or pipe 33 which is opened or closed or otherwise controlled by the valve 34. It will thus be seen that dependent upon which one or more of these valves is left open, a part of the filter discharge can be returned to any one or more of the points 10a, 12a or 20a, as the c se may be, namely, to the polluted liquid that is on its way to the primary clarifier; to the sewage effluent passing from the primary clarifier; or to the effluent from the intermediate clarifier preparatory to introduction into the filter. Likewise, if the valve of pipe 26c is closed and the valve of pipe 26d is open, it will be evident that the effluent from the secondary sedimentation tank or clarifier can be passed to any one or more of the locations just mentioned whereby the effluent from the secondary sedimentation tank will provide that portion of the filter effluent which is ultimately returned to the filter for the purpose of seeding the filter-bed or for serving as material for augmenting the rest of the liquid flowing thereto.

According to the system of Fig. 3 the sludge from the primary clarifier 11 passes along the path 36 and 40 and is pumped by pump 41 along path 42 into a digester 43. According to the system of Fig. 3 there is also provided a path 38 leading to the entrance side of this pump 41 whereby sludge from the intermediate clarifier 17 can also be passed into the digester 43. The pipe or path 36 can at will be closed or opened by means of valve 37 and likewise the pipe or path 38 can be opened or closed by the valve 39.

Some of the sludge, in fact a main portion of the sludge, from the secondary clarifier 24 of Fig. 3 can be passed therefrom through the pipe 44 by operating the pump mechanism which includes pipe 44, pump 45 and pipe 46.

From what has preceded, it is manifest:

That recirculation of tank liquor (the liquid within the clarifier) in a sewage treatment filter-bed system, (1) enables a smaller clarifier to be used without sacrificing effective detention capacity thereof; (2) expands or extends the biologic activity beyond the filter-bed itself into the clarifier; (3) prevents the premature release of unstabilized solids from the system by assuring repeated exposure thereof to the necessary biologic action; (4) functions in augmenting the raw sewage fed to the filter-bed to give rates of liquid application to the filter-bed that flush the accumulations of jelly from the interstices between the filter-bed media and thus prevent clogging and consequent ponding; (5) functions in supplying ample food to the immotile bacteria while constantly removing therefrom their end products or excrescences and to thus prevent smothering; (6) enables the active biologic concentration to be substantially as great in the upper section of the filter-bed as in the lower and thus be made more uniform; and (7) provides nuclei which, when a flocculation or chemical dosing station is used, attract other suspended solids and thus aid in the coagmentation or coagulation thereof into larger solids.

That the use of a suspended-solids congregating station, that makes use of chemical coagulation or mechanical coagmentation, ahead of the filter-bed, relieves the bacteria of such work which lets them concentrate on the purification and stabilizing of the putrescible or septical organics, which results in the possibility of using a smaller filter-bed to the extent of from ten to fifteen percent less size than is normal.

That the use of mechanical flocculation as a solids-congregating device avoids the recurring cost of chemicals for a chemical precipitation station, and has the added advantage of producing integrated flocs that have been conditioned for settleability, which aids in the removal thereof from the system by means of quiescent sedimentation. Also the agitation of flocculation tends to force air into the liquid which produces more dissolved oxygen in the liquid and this is beneficial to bacterial activity in the filter-bed.

The invention is particularly useful in a continuous system or method but it will be manifest that certain of the novel features thereof are also particularly useful in a system or method wherein such operations are carried out. This is particularly important for this type of system lends itself admirably to the use of mechanically cleaned clarifiers of the continuously operating type. As this system is designed for treating liquids that are polluted with septical or putrescible organics, every precaution must be taken to remove these solids from the system substantially as soon as they are deposited in the form of sludge in the clarifier that is closed circuited with the filter-bed.

An unexpected advantage of the practice of this invention is that it keeps down, if not obviates, the fly nuisance that before my invention was considered inevitably concomitant with filter-bed operation.

This patent matures from a patent application that was a continuation in part of my parent patent application Serial No. 704,954 filed January 2, 1934.

I claim:

1. The method of treating liquids polluted with septical organics, which comprises supplying liquid to a biologically active trickling filter-bed to be treated therein by aerobic biologic organisms of zoogloeic interfaces in the trickling filter-bed for satisfying certain of the biological oxygen demand of the septical organics, passing filter-bed discharge to a clarifier horizontally spaced from the filter-bed and having an overflow of clarified effluent, removing sediment from the clarifier to avoid septicity in the liquid contents of the clarifier, and agumenting the liquid passing to the filter-bed with liquid bearing active organisms taken from the clarifier direct to the filter-bed in amount sufficient to flush continually zoogloeic accumulations from the filter-bed thereby insuring against their developing to clogging proportions and also keeping vitalized the aerobic biologic organisms functioning within the filter-bed while at the same time conveying from the filter-bed into the clarifier quantities of such living organisms whereby certain biologic satisfaction of oxygen demand is also continued within the clarifier.

2. The method of treating liquids polluted with septical organics, which comprises continually supplying and distributing incoming fresh liquid so as to receive an initial but partial biologic treatment in an aerobic biologically-active trickling filter-bed, passing filter-bed discharge containing putrescible settleable organic material to a clarifier horizontally spaced from the filter-bed for holding a body of liquid in quiescent condition favorable for the deposition of settleable solids and having an overflow of supernatant clarified liquid effluent, removing and discarding deposited material from the clarifier before septic conditions should become established within the clarifier, and augmenting liquid being supplied for biologic treatment with tank liquor from the clarifier containing active biologic organisms and organic matter thus providing augmenting organisms and nutriment which furthers biologic development within the bed and which also supplies an augmenting flow sufficient in volume for assuring the washing of biological excretions from the gel interfaces within the filter-bed and thereby functioning to avoid the development of excessively large gel interfaces within the filter-bed.

3. The method of continuously treating liquids polluted with septical organics, which comprises supplying inflowing liquid to a trickling filter-bed and distributing it thereupon to be treated therein by aerobic biologic organisms for satisfying oxygen demand of the septical organics, passing filter-bed discharge to a clarifier horizontally spaced from the filter-bed and holding a body of liquid in quiescent condition conducive to the sedimenting of suspended solids and having overflow of supernatant clarified liquid, removing and discarding organic sediment from the clarifier for preventing septicity within the clarifier, withdrawing tank liquor containing organic matter from the clarifier and augmenting the inflowing liquid with withdrawn tank liquor sufficient in quantity to insure flushing of the interfaces to discourage clogging and for keeping vitalized the biologic organisms operating in the filter-bed while at the same time conveying from the filter-bed in the discharge thereof passing to the quiescent liquid quantities of living organisms whereby biologic satisfaction of oxygen demand is continued from the filter-bed to substantially within the quiescent liquid to an extent that active organisms are transferred from the quiescent liquid back to the liquid being treated in the filter-bed.

4. The method of treating liquids polluted with septical organics, which comprises supplying liquid to a biologically active trickling filter-bed to be treated therein by aerobic biologic organisms of zoogloeic interfaces in the trickling filter-bed for satisfying certain of the biological oxygen demand of the septical organics, passing filter-bed discharge to a clarifier horizontally spaced from the filter-bed and having an overflow of clarified effluent, removing sediment from the clarifier to avoid septicity in the liquid contents of the clarifier and continually augmenting the liquid passing to the filter-bed with liquid bearing active organisms taken from the clarifier to the filter-bed in amount sufficient to flush continually zoogloeic accumulations from the filter-bed thereby insuring against their developing to clogging proportions and also keeping vitalized the aerobic biologic organisms functioning within the filter-bed while at the same time conveying from the filter-bed into the clarifier quantities of such living organisms whereby certain biologic satisfaction of oxygen demand is also continued within the clarifier.

OSCAR WARD.